Sept. 18, 1951     R. L. HALLOCK     2,567,935
SELF-LOCKING NAIL
Filed Feb. 16, 1945
FIG. 1
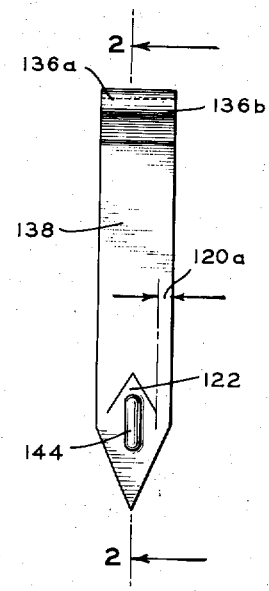
FIG. 2
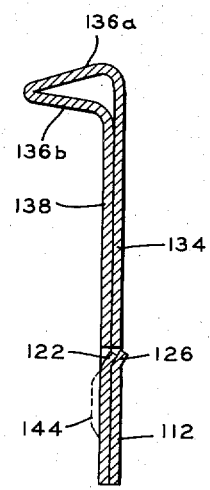
FIG. 3
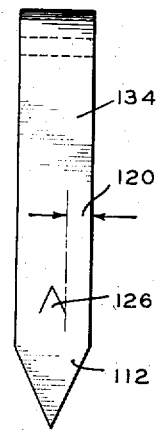
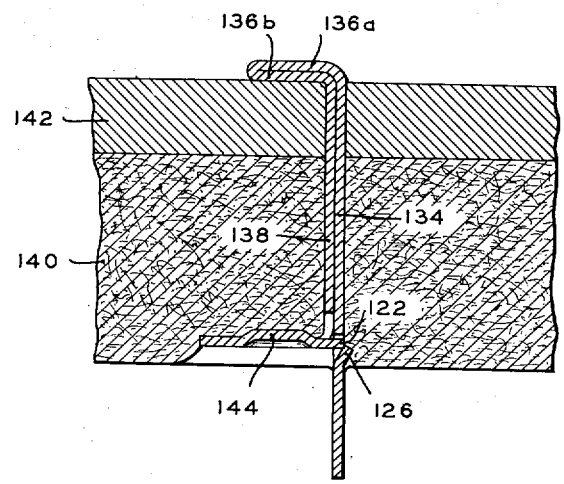
FIG. 4
*INVENTOR.*
ROBERT LAY HALLOCK
BY
*ATTORNEY*

Patented Sept. 18, 1951

2,567,935

UNITED STATES PATENT OFFICE 2,567,935

SELF-LOCKING NAIL

Robert Lay Hallock, Larchmont, N. Y., assignor to Elastic Stop Nut Corporation of America, Union Township, N. J., a corporation of New Jersey Application February 16, 1945, Serial No. 578,153

2 Claims. (Cl. 85—31)

The present invention relates to self-locking nails and has particular reference to nails which achieve their locking action by distortion to spread a part of the nail when the nail is driven home, so as to grip and hold in material of such nature that the ordinary nail will not hold with sufficient strength.

The nail of the present invention operates in accordance with the principles of the nail disclosed in my co-pending application Serial No. 568,279½, filed December 15, 1944, and the general object is to provide a novel and extremely simple form of nail that will have adequate holding power in building materials of a wide variety of kinds such as Celotex and other relatively soft fibrous wallboard materials; which will be usable with frangible materials such as gypsum or plaster-board and the like; and which will be readily manufacturable by high speed mass production methods at extremely low cost.

The manner in which the above enumerated and other objects are obtained and the advantages to be derived from the use of the invention will best be understood from the ensuing portion of this specification taken in conjunction with the accompanying drawings forming a part hereof, in which:

Fig. 1 is a side elevation of a nail embodying the invention;

Fig. 2 is a section taken on the line 2—2 of Fig. 1;

Fig. 3 is a side elevation of the nail looking from the side opposite that shown in Fig. 1; and Fig. 4 is a sectional view of the nail after having been driven home.

Referring now to the drawings the nail is made from a long narrow blank of sheet metal. At about its midportion the blank is bent back upon itself to form a driving shank 134, a holding shank 138 and a head portion consisting of two plate parts 136a and 136b, forming between them a V extending laterally from the two adjacent shanks and connecting the latter at the head end of the nail.

The blank is first bent to the general shape shown in Fig. 2 as a first operation, and thereafter, by a shearing operation, projections pointing toward the head end of the nail are formed in the two shanks, this being indicated at 122 and 126, respectively. Advantageously these projections are of triangular configuration but they may be of other shape and as will be evident from a comparison of Figs. 1 and 3 the projection 122 on shank 138 is wider across its base than the projection 126 in shank 134, so that the webs 128 in shank 134 are wider than the webs 128a in shank 138. The two shanks are advantageously, as shown, disposed in face to face contact and both shanks are pointed, with neither of said pointed ends extending appreciably beyond the other at the penetrating end of the nail. The pointing operation may be a part of the blanking operation or after the material is bent to the form shown in Fig. 2 the points 112 may be formed by a shearing operation simultaneous with that which forms the projections 122 and 126. Also, the shank 138 may advantageously be provided with a longitudinally extending stiffening rib 144 extending from the base part of the projection 122 toward the free end of the shank.

The action of the nail will be largely obvious from Fig. 4. As shown by Fig. 2 the projection 122 is located in the recess provided by the outward bending of the projection 126 and when the relative longitudinal movement between the two shanks takes place as the nail is driven home and the head is distorted, the projection 122 enters the aperture in the driving shank 134 and his action operates to cause the lower end of the holding shank to be bent outwardly as shown. It will be apparent that the nail will be very cheap to manufacture since the dies for forming it will be extremely simple, and even though the shanks are flat, I have found that the nail is sufficiently rigid to be driven into numerous kinds of the softer types of building materials, since the aperture formed by the creation of the projection 126 is relatively narrow and substantial webs or ligaments to either side of this are provided.

While from a practical standpoint it is most advantageous to provide an aperture in the driving shank into which the projection on the holding shank can pass when the nail is driven home, it will be apparent that the action characteristic of the invention can be effected by forming in the driving shank a suitable recess providing an abutment against which the projection on the holding shank can catch and hold in order to effect the desired bending of the holding shank.

From the foregoing it will be apparent that the invention is not limited to any given specific design but that many changes in the particular form of the nail may be made without departing from the spirit of the invention, the scope of which is to be understood as encompassing all devices falling within the purview of the appended claims.

What I claim is:

1. A nail comprising a continuous strip of sheet metal bent to provide two substantially flat adjacent shanks, one of said shanks constituting a driving shank pointed at one end to penetrate material into which the nail is driven and the second shank constituting a holding shank, said driving shank extending beyond said holding shank at the head end of the nail, a collapsible head connecting the head ends of said shanks, said head being of loop-like form providing an upper striking portion joining the driving shank and a lower abutment portion joining the holding shank, said shanks being provided intermediate their ends with generally V-shaped tongues formed from material of the respective shanks and pointing toward the head end of the nail, the tongues being bent out of the planes of the respective shanks and the tongue or the holding shank being bent to engage the wall of the aperture created by bending the tongue of the driving shank out of the plane of the latter shank, whereby upon relative movement of the holding shank toward the head end of the nail when said head is collapsed the free end portion of the holding shank is caused to bend laterally away from said driving shank.

2. A nail comprising a continuous strip of sheet metal bent to provide two substantially flat adjacent shanks, one of said shanks constituting a driving shank pointed at one end to penetrate material into which the nail is driven and a second shank constituting a holding shank pointed at one end to penetrate said material, neither of said pointed ends extending appreciably beyond the other at the penetrating end of the nail and said driving shank extending beyond said holding shank at the head end of the nail, a collapsible head connecting the head ends of said shanks, said head being of loop-like form providing an upper striking portion joining the driving shank and a lower abutment portion joining the holding shank, means providing an abutment forming a stop on said driving shank intermediate its ends and a projection formed on said holding shank intermediate its ends and located to engage said stop upon relative movement of the holding shank toward the head end of the nail and cause the free end portion of the holding shank to bend laterally away from said driving shank when said head is collapsed.

ROBERT LAY HALLOCK.

REFERENCES CITED

The following references are of record in the file of this patent:

UNITED STATES PATENTS

| Number | Name | Date |
|---|---|---|
| 308,837 | Frost | Dec. 2, 1884 |
| 1,056,190 | Lorenz | Mar. 18, 1913 |
| 1,864,424 | Franklin | June 21, 1932 |
| 2,150,788 | Shippee et al. | Mar. 14, 1939 |
| 2,222,338 | Roberts | Nov. 19, 1940 |
| 2,369,961 | Gisondi | Feb. 20, 1945 |

FOREIGN PATENTS

| Number | Country | Date |
|---|---|---|
| 192,492 | Great Britain | Feb. 5, 1923 |

Certificate of Correction

Patent No. 2,567,935 September 18, 1951

ROBERT LAY HALLOCK

It is hereby certified that error appears in the printed specification of the above numbered patent requiring correction as follows:

Column 4, list of references cited, under "UNITED STATES PATENTS" add the following:

*2,429,113*     *Warner* _____ *Oct. 14, 1947* and that the said Letters Patent should be read as corrected above, so that the same may conform to the record of the case in the Patent Office.

Signed and sealed this 22nd day of January, A. D. 1952.

[SEAL]

THOMAS F. MURPHY,
*Assistant Commissioner of Patents.*